A. S. ACKER.
Hoe.
No. 162,596.
Patented April 27, 1875.
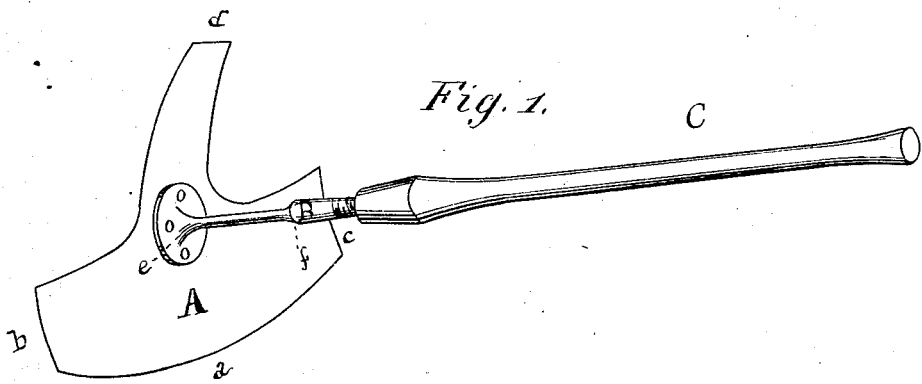
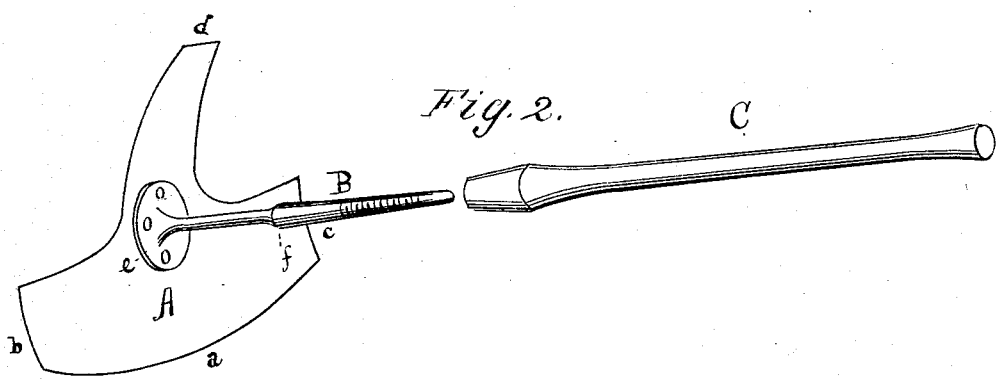
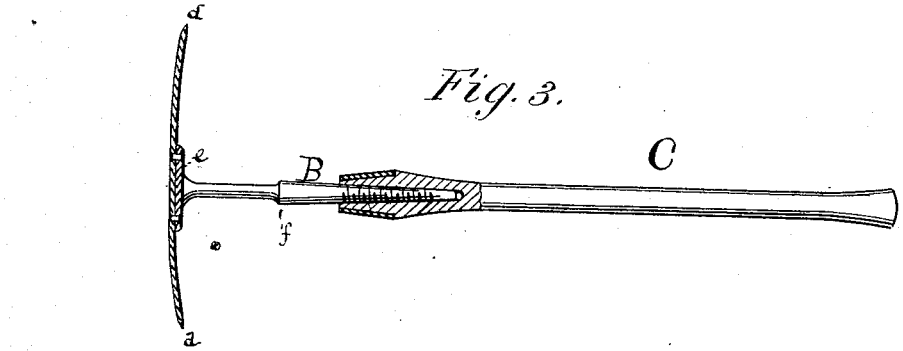
Witnesses
Chas Thurman
R. A. Dyer
Inventor
Allen S. Acker
by Geo. W. Dyer & Co
attys

UNITED STATES PATENT OFFICE.

ALLEN S. ACKER, OF LOCKPORT, NEW YORK.

IMPROVEMENT IN HOES.

Specification forming part of Letters Patent No. 162,596, dated April 27, 1875; application filed June 22, 1874.

*To all whom it may concern:*

Be it known that I, ALLEN S. ACKER, of Lockport, in the county of Niagara and State of New York, have invented a new and useful Improvement in Hoes; and I do hereby declare that the following is a full and exact description of the same, reference being had to the accompanying drawings and to the letters of reference marked thereon.

The object I have in view is the construction of a light, strong, and convenient hand-hoe for garden or farm purposes; and my invention therein consists in a peculiarly-shaped blade having six cutting-edges, and a peculiarly-constructed shank and handle, all of which are more fully hereinafter explained.

To enable those skilled in the art to make and use my invention, I proceed to describe the same in connection with the drawing, in which—

Figure 1 is a perspective view of the hoe with handle attached; Fig. 2, a similar view of hoe with handle detached, and Fig. 3 a central section of the same.

Like letters denote similar parts in each figure.

A represents the blade of my hoe, having the general shape of an inverted T, and having four cutting-edges, *a*, *b*, *c*, and *d*. The edge of the blade *a* may be either straight or rounding, as desired, the latter shape being preferable in hilling, as it carries more soil before it. The other cutting-edges, *b*, *c*, and *d*, may be either straight or slightly rounding, and with the edge *a* adapted rather for use in vegetable or flower gardens to cut away weeds and grasses, and hill up on both sides of two contiguous rows without necessitating a change of position sidewise of the person using the hoe. The upper cutting-edge *d* is useful in making drill-rows, and in cutting grass and weeds. The shank B is fastened to the blade A by means of four rivets, which pass through a boss, *e*, on the end of the shank, and four holes pierced in the blade a little above its center.

The shank is secured to this point of the blade in order that the boss may give the greatest support to all parts of the blade. It will be seen that it is centrally placed with reference to each of the cutting-edges, allows a preponderance of weight to the lower part of the blade, which is most in use, and gives a proper support to the upper and weaker portion.

This boss being quite large, and the rivets being well distributed around the circumference, the blade A is not materially weakened by the rivet-holes, and the shank and blade are very firmly secured together.

A short distance from the blade, at *f*, the shank is enlarged, and then tapers gradually to a point. A screw is cut on this tapering part of the shank, which is inserted into the end of a wooden handle, C, bound at its end by a metal band or ferrule. It will be seen, therefore, the farther the shank is inserted or screwed in, the stronger the parts will be connected.

The shank may have a shoulder at the point *f*, against which the handle C will rest when screwed on the shank, thus giving it a neater and more finished appearance.

Having thus described my invention, and explained its use, I now claim as new—

The hoe described, composed of the blade A, having six cutting sides, the shank B, having a boss at one end, by which it is secured to the blade, and a screw-thread at the other end, by means of which it is secured to the handle, substantially as described and shown.

This specification signed and witnessed this 18th day of June, 1874.

ALLEN S. ACKER.

Witnesses:
 C. S. MATHEWS,
 GEO. S. FISHER.